(12) United States Patent
Chen et al.

(10) Patent No.: US 12,094,095 B2
(45) Date of Patent: Sep. 17, 2024

(54) IMAGE PROCESSING METHOD, TERMINAL AND NON-TRANSITORY COMPUTER-READABLE STORAGE MEDIUM

(71) Applicant: SHENZHEN SKYWORTH-RGB ELECTRONIC CO., LTD., Shenzhen (CN)

(72) Inventors: Hongbo Chen, Shenzhen (CN); Jinxue Fu, Shenzhen (CN); Xiaoxia Wu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 361 days.

(21) Appl. No.: 17/509,388

(22) Filed: Oct. 25, 2021

(65) Prior Publication Data

US 2022/0044369 A1 Feb. 10, 2022

Related U.S. Application Data

(63) Continuation of application No. PCT/CN2020/113857, filed on Sep. 8, 2020.

(30) Foreign Application Priority Data

Dec. 27, 2019 (CN) .......................... 201911402111.4

(51) Int. Cl.
*G06T 5/92* (2024.01)
*G06V 40/16* (2022.01)

(52) U.S. Cl.
CPC .............. *G06T 5/92* (2024.01); *G06V 40/162* (2022.01); *G06V 40/165* (2022.01)

(58) Field of Classification Search
None
See application file for complete search history.

(56) References Cited

U.S. PATENT DOCUMENTS

2010/0158324 A1 6/2010 Liu
2013/0128080 A1 5/2013 Hsu
(Continued)

FOREIGN PATENT DOCUMENTS

CN 105488793 A 4/2016
CN 106375316 A 2/2017
(Continued)

OTHER PUBLICATIONS

Machine translation of CN 108364271A (Year: 2018).*
(Continued)

*Primary Examiner* — Nancy Bitar
(74) *Attorney, Agent, or Firm* — Westbridge IP LLC (57) ABSTRACT

Disclosed are an image processing method, a terminal and a non-transitory computer-readable storage medium. The image processing method includes: acquiring and detecting a first image, and determining whether the first image has a face image; in response that the first image has a face image, acquiring image information of a face region where the face image is located in the first image, and calculating an average brightness in the face region based on the image information; adjusting a brightness in the face region based on the average brightness and a preset model; acquiring parameter information of each pixel in the face region, and adjusting the parameter information of each pixel based on the parameter information and a preset rule, and generating a second image; and superimposing the first image and the second image, generating and displaying a third image.

18 Claims, 9 Drawing Sheets

(56) References Cited

U.S. PATENT DOCUMENTS

2023/0377302 A1* 11/2023 Haller .................... G06V 40/19
2023/0379564 A1* 11/2023 Haller .................... G06V 40/40

FOREIGN PATENT DOCUMENTS

| CN | 107256543 | * | 10/2017 | |
|----|-----------|---|---------|---|
| CN | 107256543 A | | 10/2017 | |
| CN | 107766831 A | | 3/2018 | |
| CN | 108230331 A | | 6/2018 | |
| CN | 108364271 | * | 8/2018 | |
| CN | 108364271 A | * | 8/2018 | ............... G06T 5/40 |
| CN | 109859098 A | | 6/2019 | |
| CN | 110069974 A | | 7/2019 | |
| CN | 111160267 A | | 5/2020 | |

OTHER PUBLICATIONS

International Search Report and Written Opinion issued in corresponding PCT Application No. PCT/CN2020/113857, dated Dec. 11, 2020.

Examination Report issued in counterpart Indian Patent Application No. 202127049315, dated Aug. 3, 2022.

First Office Action issued in counterpart Chinese Patent Application No. 201911402111.4, dated Jan. 31, 2023.

* cited by examiner

First preset curve model　　Second preset curve model　　Third preset curve model

IMAGE PROCESSING METHOD, TERMINAL AND NON-TRANSITORY COMPUTER-READABLE STORAGE MEDIUM

CROSS-REFERENCE TO RELATED APPLICATIONS

The present disclosure is a continuation application of International Application No. PCT/CN2020/113857, filed on Sep. 8, 2020, which claims priority to Chinese Patent Application No. 201911402111.4, filed on Dec. 27, 2019, entitled "Image processing method, terminal and storage medium", the entire disclosure of which is incorporated herein by reference.

FIELD OF THE DISCLOSURE

The application relates to a technical field of image processing, in particular to an image processing method, a terminal, and a non-transitory computer-readable storage medium.

BACKGROUND OF THE DISCLOSURE

In order to enhance image performance, both contrast and color enhancement technologies are presently used in TV's image processing. However, the contrast protection to face skin color in TV sets will flat skin color levels, while contrast enhancement will bring the abrupt effect leading to a "white-dark face" in face images. The related art is poor at processing human faces in TV sets.

Therefore, it is necessary to provide an image processing method to solve the aforementioned technical problems.

The aforementioned is to assist in understanding the technical solutions of the present disclosure, and does not necessarily admit that the aforementioned constitutes the prior art.

SUMMARY OF THE DISCLOSURE

The present disclosure is to provide an image processing method, a terminal and a non-transitory computer-readable storage medium, aiming at solving the technical problem of poor processing performance on face images in an image in the related art.

To achieve the above purpose, the image processing method proposed in the present disclosure includes the following operations:

acquiring and detecting a first image, and determining whether the first image has a face image;

in response that the first image has a face image, acquiring image information of a face region where the face image is located in the first image, and calculating average brightness in the face region based on the image information;

adjusting brightness in the face region based on the average brightness and a preset model;

acquiring parameter information of each pixel in the face region, and adjusting the parameter information of each pixel based on the parameter information and a preset rule, and generating a second image; and superimposing the first image and the second image, generating and displaying a third image.

In one embodiment, the image information includes color values for each color channel; and the operation of "in response that the first image has a face image, acquiring image information of a face region where the face image is located in the first image, and calculating an average brightness in the face region based on the image information", includes:

in response that the first image has the face image, obtaining a color value for each color channel in the face region; and calculating the average brightness in the face region based on the color values for each color channel and a preset algorithm.

In one embodiment, the operation of "adjusting brightness in the face region based on the average brightness and a preset model", includes:

acquiring the average brightness, and determining whether the average brightness is greater than or equal to a first preset value;

in response that the average brightness is greater than or equal to the first preset value, increasing brightness of pixels within a middle tone range in the face region and decreasing brightness of pixels within a light tone range in the face region based on the first preset curve model;

in response that the average brightness is less than the first preset value, determining whether the average brightness is less than a second preset value;

in response that the average brightness is less than the second preset value, increasing brightness of pixels between the middle tone range and the dark tone range in the face region based on a second preset curve model; and in response that the average brightness is less than the first preset value and greater than or equal to the second preset value, increasing the brightness of pixels within the middle tone range in the face region based on a third preset curve model.

In one embodiment, the parameter information includes tone information; and the operation of "acquiring parameter information of each pixel in the face region, and adjusting the parameter information of each pixel based on the parameter information and a preset rule, and generating a second image", includes:

acquiring the tone information of each pixel in the face region, and calculating an average tone value of the face region based on the tone information;

determining whether the average tone value is greater than or equal to a preset tone value;

in response that the average tone value is greater than or equal to the preset tone value, reducing a tone value of each pixel in the face region; and in response that the average tone value is less than the preset tone value, increasing the tone value of each pixel in the face region, and generating the second image.

In one embodiment, the parameter information includes saturation information; and the operation of "acquiring parameter information of each pixel in the face region, and adjusting the parameter information of each pixel based on the parameter information and a preset rule, and generating a second image", includes:

acquiring the saturation information of each pixel in the face region, and calculating an average saturation value of the face region based on the saturation information;

determining whether the average saturation value is greater than or equal to a preset saturation value;

in response that the average saturation value is greater than or equal to the preset tone value, increasing a saturation value of each pixel in the face region by a first preset saturation value; and in response that the average saturation value is less than the preset saturation, increasing the saturation value of each pixel in the face region by a second preset saturation value, and generating the second image, wherein the second preset saturation value is greater than the first preset saturation value.

In one embodiment, the operation of "acquiring and detecting a first image, and determining whether the first image has a face image" includes:

acquiring the first image;

detecting the first image, obtaining image pixels of the first image, and calculating a similarity between the image pixels and a preset skin color model;

determining whether the similarity exceeds a preset threshold; and in response that the similarity exceeds the preset threshold, determining that the first image has the face image.

In one embodiment, the operation of "superimposing the first image and the second image, generating and displaying a third image", includes:

acquiring first parameter information of the face region in the first image and second parameter information of the face region in the second image;

averaging the first parameter information and the second parameter information to obtain third parameter information; and generating and displaying the third image based on the third parameter information.

In one embodiment, prior to the operation of "acquiring and detecting a first image, and determining whether the first image has a face image" includes:

eliminating a color shift on the first image.

In order to achieve the above purpose, the present disclosure further provides a terminal, which includes a processor and a memory storing one or more programs for image processing including instructions that, when executed by the processor, cause the terminal to implement the operations described above.

Additionally, the present disclosure further provides a storage medium, where instructions are stored on the storage medium, and when the instructions are executed by a processor, operations are implemented as described above.

The image processing method proposed in the present disclosure, includes: acquiring and detecting a first image, and determining whether the first image has a face image; in response that the first image has a face image, acquiring image information of a face region where the face image is located in the first image, and calculating an average brightness in the face region based on the image information; adjusting brightness in the face region based on the average brightness and a preset model; acquiring parameter information of each pixel in the face region, and adjusting the parameter information of each pixel based on the parameter information and a preset rule, and generating a second image; superimposing the first image and the second image, generating and displaying a third image. As such, the expression of human faces is improved, and viewing experience is thus enhanced to the viewers.

DETAILED DESCRIPTION OF THE EMBODIMENTS

As following, the technical solutions in the embodiments of the present disclosure will be described clearly and completely with reference to the drawings in the embodiment of the present disclosure. Obviously, the described embodiments are only a part of the embodiment of the present disclosure, not all of the embodiments. Based on the embodiments in the present disclosure, all other embodiments perceived by those ordinary skills in the art without creative effort should fall within the protection scope of the present disclosure.

The present disclosure provides an image processing method, a terminal and a non-transitory computer-readable storage medium.

Figure 1:
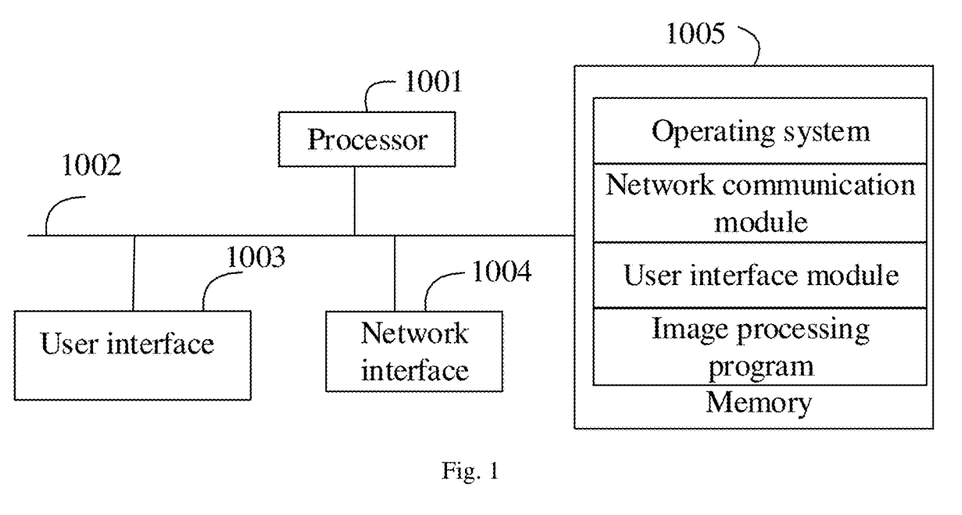
FIG. 1 is a system schematic diagram of the hardware operating environment terminal according to some embodiments of the present disclosure.

As shown in FIG. 1, the method is applicable to a terminal, including but not limited to the following terminals: tablets, computers, televisions, etc. The terminal may include a processor 1001, such as a CPU, a communication bus 1002, a user interface 1003, a network interface 1004 and a memory 1005. The communication bus 1002 is configured to realize the connection and communication between these components. The user interface 1003 may include a touch panel, a touch screen and a keyboard, and optionally, the user interface 1003 may also include a standard wired interface and a wireless interface. The network interface 1004 may optionally include a standard wired interface and a wireless interface (such as a WI-FI interface). The memory 1005 may be a high-speed RAM memory or a non-volatile memory, such as a disk memory. Optionally, the memory 1005 may also be a storage device independent of the aforementioned processor 1001.

Optionally, the terminal may further include Radio Frequency (RF) circuitry, audio circuitry, Wi-Fi modules, and etc. Of course, the terminal can further be equipped with other sensors such as gyroscopes, barometers, hygrometers, infrared sensors, etc., which will not be described in detail herein.

It would be understood by those skilled in the art that the terminal shown in FIG. 1 does not constitute a limitation to the terminal, which may include more or fewer components than shown, or some components may be combined, or different components arranged.

As shown in FIG. 1, the memory 1005 as a computer storage medium may include an operating system, a network communication module, a user interface module, and an image processing program.

In the terminal shown in FIG. 1, the processor 1001 can be configured to call the image processing program stored in the memory 1005 and perform the following operations:

acquiring and detecting a first image, and determining whether the first image has a face image;

in response that the first image has a face image, acquiring image information of a face region where the face image is located in the first image, and calculating an average brightness in the face region based on the image information;

adjusting brightness in the face region based on the average brightness and a preset model;

acquiring parameter information of each pixel in the face region, and adjusting the parameter information of each pixel based on the parameter information and a preset rule, and generating a second image;

superimposing the first image and the second image, generating and displaying a third image.

Further, the processor 1001 can call the image processing program stored in the memory 1005 and also perform the following operations:

in response that the first image has the face image, obtaining color values for each color channel in the face region;

calculating the average brightness in the face region based on the color values for each color channel and a preset algorithm.

Further, the processor 1001 can call the image processing program stored in the memory 1005 and also perform the following operations:

acquiring the average brightness, and determining whether the average brightness is greater than or equal to a first preset value;

in response that the average brightness is greater than or equal to the first preset value, increasing brightness of pixels within a middle tone range in the face region and decreasing brightness of pixels within a light tone range in the face region based on the first preset curve model;

in response that the average brightness is less than the first preset value, determining whether the average brightness is less than a second preset value;

in response that the average brightness is less than the second preset value, increasing brightness of pixels between the middle tone range and the dark tone range in the face region based on a second preset curve model;

in response that the average brightness is less than the first preset value and greater than or equal to the second preset value, increasing the brightness of pixels within the middle tone range in the face region based on a third preset curve model.

Further, the processor 1001 can call the image processing program stored in the memory 1005 and also perform the following operations:

acquiring the tone information of each pixel in the face region, and calculating an average tone value of the face region based on the tone information;

determining whether the average tone value is greater than or equal to a preset tone value;

in response that the average tone value is greater than or equal to the preset tone value, reducing the tone value of each pixel in the face region; and in response that the average tone value is less than the preset tone value, increasing the tone value of each pixel in the face region, and generating the second image.

Further, the processor 1001 can call the image processing program stored in the memory 1005 and also perform the following operations:

acquiring the saturation information of each pixel in the face region, and calculating an average saturation value of the face region based on the saturation information;

determining whether the average saturation value is greater than or equal to a preset saturation value;

in response that the average saturation value is greater than or equal to the preset tone value, increasing the saturation value of each pixel in the face region by a first preset saturation value; and in response that the average saturation value is less than the preset saturation, increasing the saturation of each pixel in the face region by a second preset saturation value, and generating the second image, wherein the second preset saturation value is greater than the first preset saturation value.

Further, the processor 1001 can call the image processing program stored in the memory 1005 and also perform the following operations:

acquiring the first image;

detecting the first image, obtaining image pixels of the first image, and calculating a similarity between the image pixels and a preset skin color model;

determining whether the similarity exceeds a preset threshold; and in response that the similarity exceeds the preset threshold, determining that the first image has the face image.

Further, the processor 1001 can call the image processing program stored in the memory 1005 and also perform the following operations:

acquiring first parameter information of the face region in the first image and second parameter information of the face region in the second image;

averaging the first parameter information and the second parameter information to obtain third parameter information;

generating and displaying the third image based on the third parameter information.

Further, the processor 1001 can call the image processing program stored in the memory 1005 and also perform the following operations:

eliminating a color shift on the first image.

Based on the above hardware structure, various embodiments of image processing method in the present disclosure are proposed.

Figure 2:
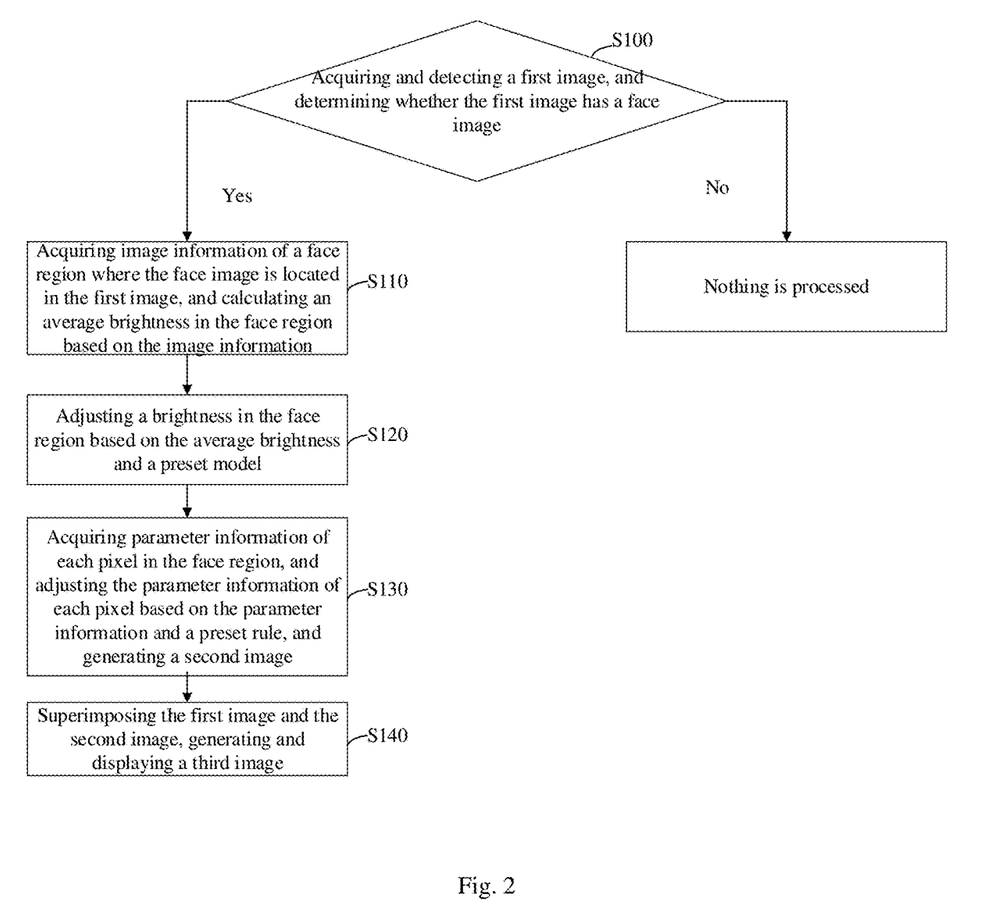
FIG. 2 is a flow chart of an image processing method according to a first embodiment of the present disclosure.

Referring to FIG. 2, a first embodiment of the present disclosure provides an image processing method, which includes:

Operation S100, acquiring and detecting a first image, and determining whether the first image has a face image.

In the present embodiment, the first image can be captured by a camera or the first image can be acquired as a video picture. Determining whether the first image has a face image can specifically be performed by obtaining image pixels via detecting the first image, and calculating similarity between the image pixels and a preset skin color model by a preset algorithm; judging whether the similarity exceeds a preset threshold; if the similarity exceeds the preset threshold, it is confirmed that there is a face image in the first image, and the preset skin color model can be trained by a vast number of face image samples with different skin colors.

Operation S110, in response that the first image has a face image, acquiring image information of a face region where the face image is located in the first image, and calculating an average brightness in the face region based on the image information.

If no face image exists in the first image, nothing would be processed.

In the present embodiment, if there is a face image in the first image, the face region in the first image can be detected by similarity test between image pixels and a preset skin color model.

In the present embodiment, the image information of the face region includes the color values for each of R, G, and B channels. Assume that the color value for R channel is CR, the color value for G channel is CG, the color value for B channel is CB, and the average brightness of the face region is Y, the average brightness Y can be calculated based on Y=0.299CR+0.587CG+0.114CB.

S120, adjusting brightness in the face region based on the average brightness and a preset model.

In the present embodiment, after obtaining the average brightness, the brightness of the face region can be adjusted based on a preset model, which can be a preset curve model obtained by machine training and preset in the terminal.

Operation S130, acquiring parameter information of each pixel in the face region, and adjusting the parameter information of each pixel based on the parameter information and a preset rule, and generating a second image.

In the present embodiment, the parameter information includes tone information and saturation information, and the preset rules can be rules of tone adjustment and saturation adjustment. The tone value of each pixel in the face region is adjusted by calculating the average tone value in the face region and comparing the average tone value with the preset tone value. The saturation value of each pixel in the face region is adjusted by calculating the average saturation value in the face region and comparing the average saturation value with the preset saturation value. The second image is obtained by adjusting the brightness, tone and saturation of pixels in the face region.

Operation S140, superimposing the first image and the second image, generating and displaying a third image.

In the present embodiment, after acquiring the adjusted second image, the first image and the second image are superimposed. The superimposition can be the averaging of the brightness, tone and saturation of pixel in the face regions of the second image and of the first image to generate a third image and display the third image. The image processing method in this embodiment adjusts the parameters of the face region in the image, to enhance the expression of the face image in the image and provide users with better image results.

Figure 3:
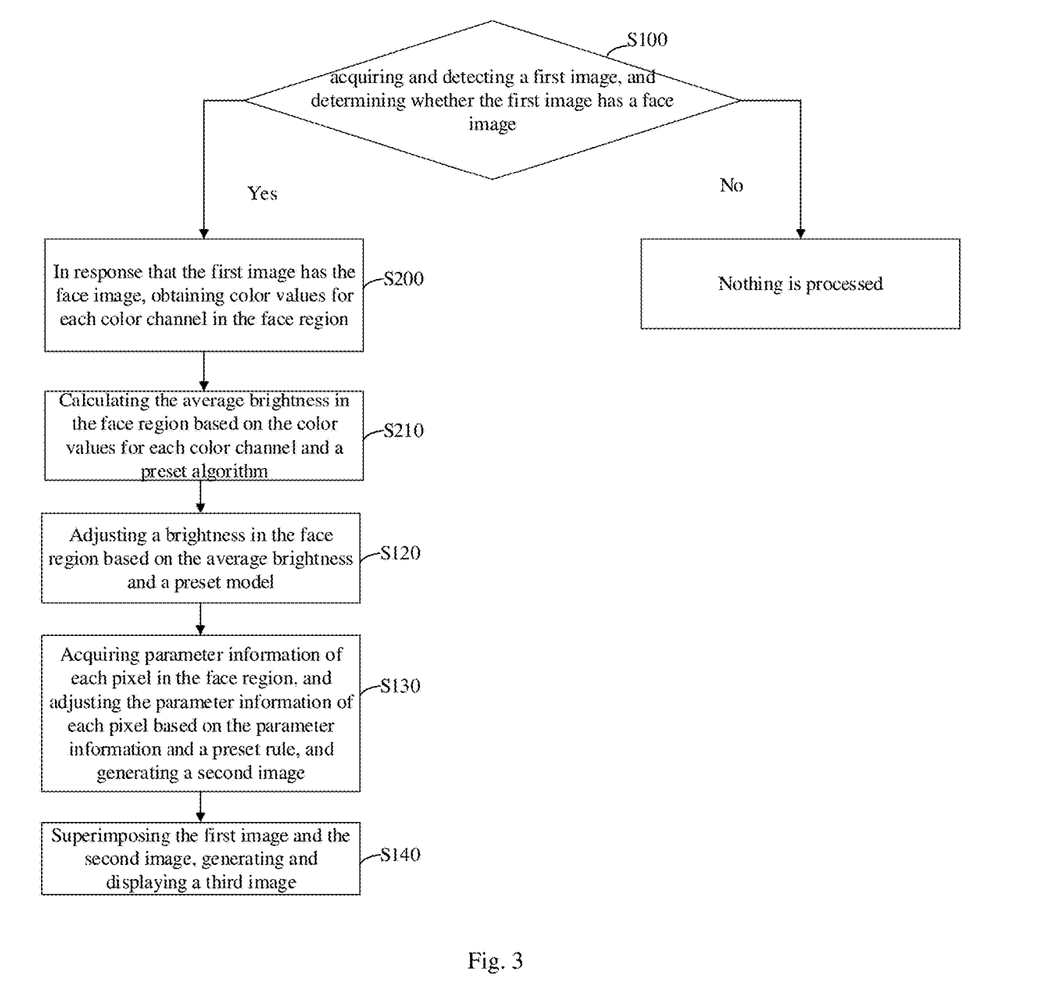
FIG. 3 is a detailed flow chart of operation S110 in an image processing method according to a second embodiment of the present disclosure.

Furthermore, a second embodiment is proposed based on the first embodiment. Referring to FIG. 3, in the second embodiment, the image information includes the color values for each color channel, and Operation S110 includes:

Operation S200, in response that the first image has the face image, obtaining color values for each color channel in the face region.

Operation S210, calculating the average brightness in the face region based on the color values for each color channel and a preset algorithm.

In the present embodiment, the first image is an RGB image. To calculate the average brightness in the face region of the first image, RGB color space needs to be converted into YIQ color space. The image information of the face region includes the color values for each color channel of the RGB image, including channels of R, G and B. Assume that the color value for R channel is CR, the color value for G channel is CG, the color value for B channel is CB, and the average brightness of the face region is Y, the average brightness Y can be calculated based on the corresponding conversion formulas between RGB and YIQ: Y=0.299CR+0.587CG+0.114CB.

In the present embodiment, calculating the average brightness of the face region is beneficial to judge and adjust the brightness of the face region based on the average brightness.

Figure 4:
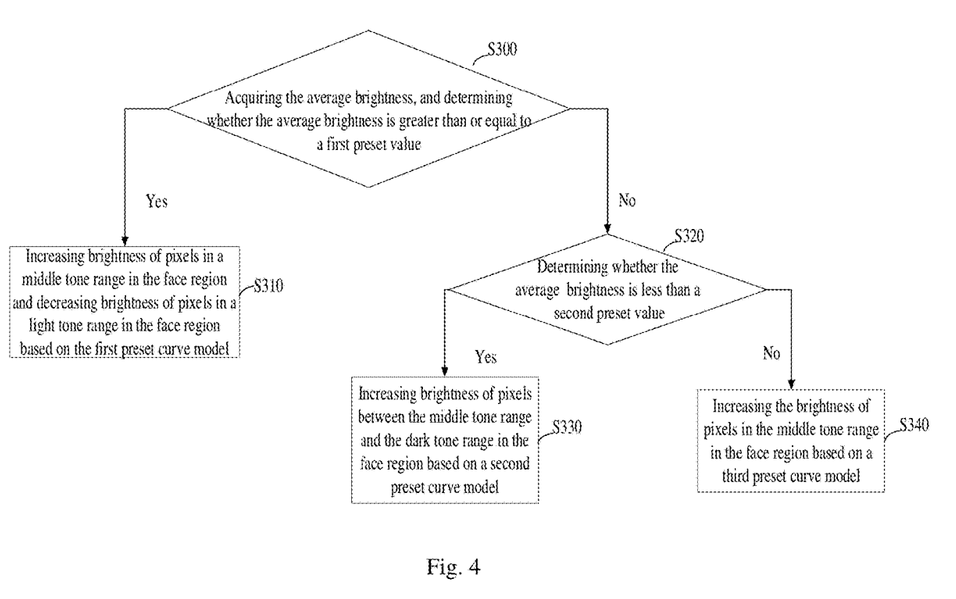
FIG. 4 is a detailed flow chart of operation S120 in an image processing method according to a third embodiment of the present disclosure.
Figure 5:
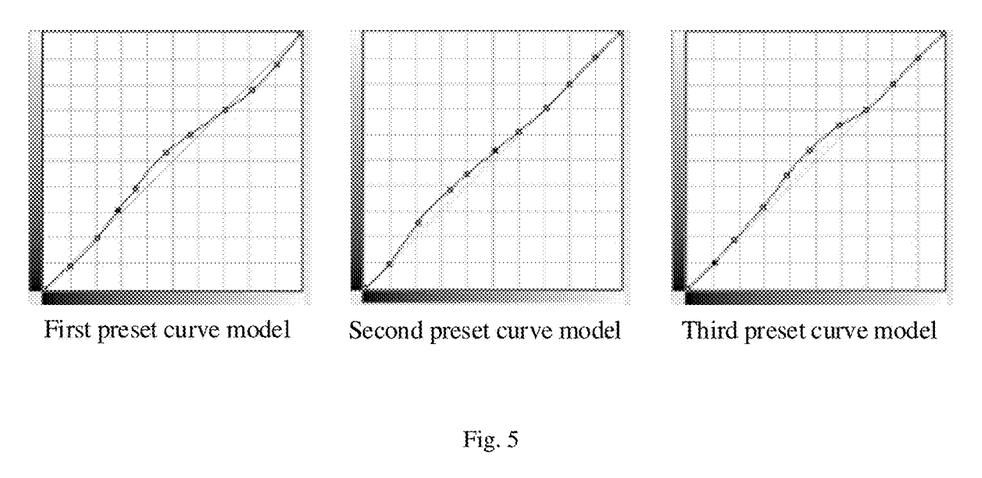
FIG. 5 is a schematic diagram of a preset curve model in the image processing method according to the third embodiment of the present disclosure.

Furthermore, a third embodiment is proposed based on the first embodiment. Referring to FIGS. 4 and 5, in the third embodiment, Operation S120 includes:

Operation S300, acquiring the average brightness, and determining whether the average brightness is greater than or equal to a first preset value.

Operation S310, in response that the average brightness is greater than or equal to the first preset value, increasing brightness of pixels within a middle tone range in the face region and decreasing brightness of pixels within a light tone range in the face region based on the first preset curve model.

In the present embodiment, the first preset value can be set to 80 nits. When the average brightness is greater than or equal to the first preset value, it indicates that the face region has a bright light. As such, the brightness of the face region is adjusted based on a first preset curve model, which is shown in FIG. 5. In the first preset curve model, the X ordinate shows the brightness information of the first image, and there are dark tone range, middle tone range and light tone range according to the lightness and darkness of each pixel, the Y ordinate shows adjusted lightness and darkness information, and there are dark tone range, middle tone range and light tone range according to the lightness and darkness of each pixel. There is no clear demarcation point between three ranges. Those skilled in the art can set lightness and darkness thresholds for the first preset curve model in advance as needed to distinguish dark pixels, middle pixels and bright pixels, and set adjustment values based on different lightness and darkness values, in order to form the first preset curve model. The adjustment of the face region by the first preset curve model can be understood as increasing the brightness of the pixels within middle tone range and decreasing the brightness of the pixels within light tone range.

Operation S320, in response that the average brightness is less than the first preset value, determining whether the average brightness is less than a second preset value.

Operation S330, in response that the average brightness is less than the second preset value, increasing brightness of pixels between the middle tone range and the dark tone range in the face region based on a second preset curve model.

In the present embodiment, the second preset value can be set to 50 nits. When the average brightness is less than the second preset value, it indicates that the light of the face region itself is dark. As such, the brightness of the face region is adjusted based on a second preset curve model, which is shown in FIG. 5. Adjusting the face region through the second preset curve model can be understood as increasing the brightness of pixels in the face region between the middle tone range to the dark tones range.

Operation S340, in response that the average brightness is less than the first preset value and greater than or equal to the second preset value, increasing the brightness of pixels within the middle tone range in the face region based on a third preset curve model.

In the present embodiment, when the average brightness is less than the first preset value and the average brightness is greater than or equal to the second preset value, it indicates that the light of the face region itself is moderate. As such, the brightness of the face region is adjusted based on a third preset curve model, which is shown in FIG. 5. Adjusting the face region through the third preset curve model can be understood as increasing the brightness of pixels in the middle tone of the pixels in the face region.

In the present embodiment, the average brightness is compared with the first preset value and the second preset value, and different preset curve models are adopted to adjust the brightness of the face region based on different comparison results, so that the brightness of the face region is more in line with the viewing experience of users.

Figure 6:
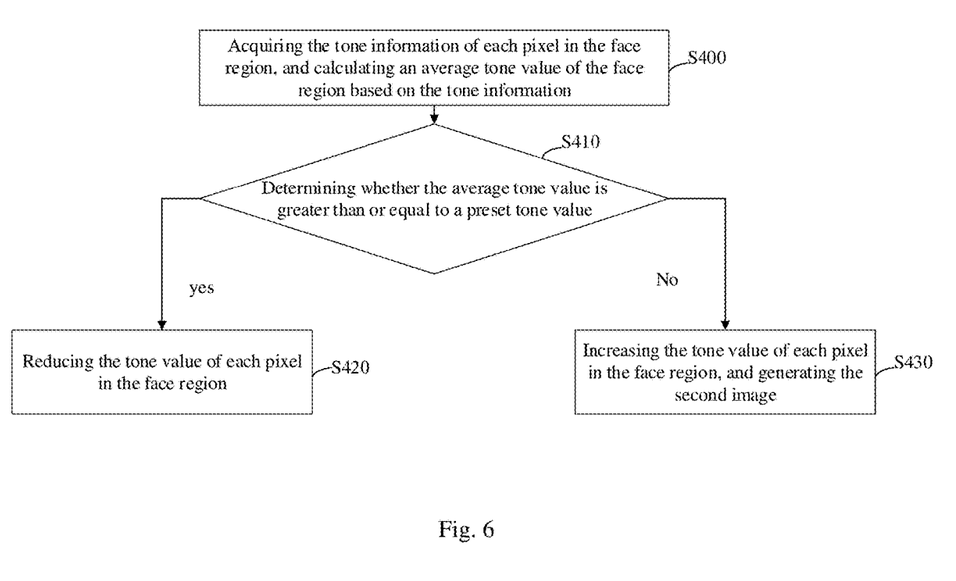
FIG. 6 is a detailed flow chart of operation S130 in an image processing method according to a fifth embodiment of the present disclosure.

Further, a fourth embodiment is proposed based on the first embodiment. Referring to FIG. 6, the parameter information includes tone information, and Operation S130 includes:

Operation S400, acquiring the tone information of each pixel in the face region, and calculating an average tone value of the face region based on the tone information.

Operation S410, determining whether the average tone value is greater than or equal to a preset tone value.

Operation S420, in response that the average tone value is greater than or equal to the preset tone value, reducing the tone value of each pixel in the face region.

In the present embodiment, if the average tone value is greater than or equal to the preset tone value, it means that there are more bright pixels in the face region, and the tone value of each pixel in the face region should be reduced as such.

Operation S430, in response that the average tone value is less than the preset tone value, increasing the tone value of each pixel in the face region, and generating the second image.

In the present embodiment, if the average tone value is less than the preset tone value, it means that there are more dark pixels in the face region, and the tone value of each pixel in the face region is increased as such.

In the present embodiment, by comparing the average tone value with the preset tone value, the tone value of each pixel in the face region is adjusted, thereby preventing overexposure and underexposure of the face image in the face region.

Figure 7:
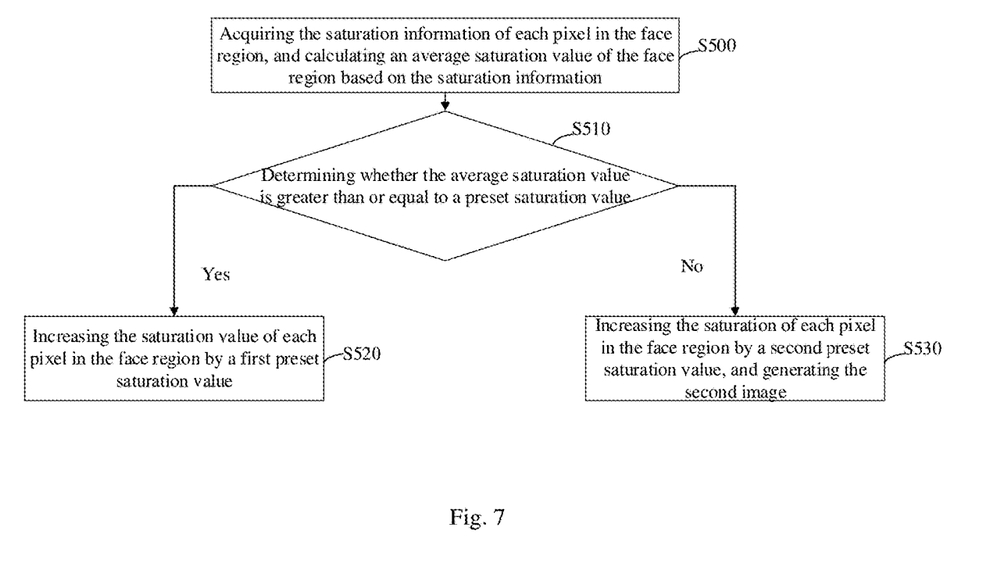
FIG. 7 is a detailed flow chart of operation S140 in an image processing method according to a sixth embodiment of the present disclosure.

Furthermore, a fifth embodiment is proposed based on the fourth embodiment. Referring to FIG. 7, in the fifth embodiment, the parameter information includes saturation information, and the operation S140 further includes:

Operation S500, acquiring the saturation information of each pixel in the face region, and calculating an average saturation value of the face region based on the saturation information.

Operation S510, determining whether the average saturation value is greater than or equal to a preset saturation value.

Operation S520, in response that the average saturation value is greater than or equal to the preset tone value, increasing the saturation value of each pixel in the face region by a first preset saturation value.

In the present embodiment, if the average saturation is greater than or equal to the preset saturation, it indicates that the color of pixels in the face region is bright. As such, the saturation of each pixel in the face region is increased by the first preset saturation value, and the color of the face region is brighter than that before adjustment.

Operation S530, in response that the average saturation value is less than the preset saturation, increasing the saturation of each pixel in the face region by a second preset saturation value, and generating the second image, wherein the second preset saturation value is greater than the first preset saturation value.

In the present embodiment, if the average saturation is less than the preset saturation, it indicates that the color of the pixels in the face region is not bright enough. As such, the saturation of each pixel in the face region is increased by a second preset saturation value which is greater than the first preset saturation value, which can greatly increase the saturation of each pixel in the face region and make the color of the face region brighter.

In the present embodiment, by comparing the average saturation with the preset saturation, the saturation of each pixel in the face region is adjusted, and the color brightness of the face region is improved, so as to improve the viewing experience of users.

Figure 8:
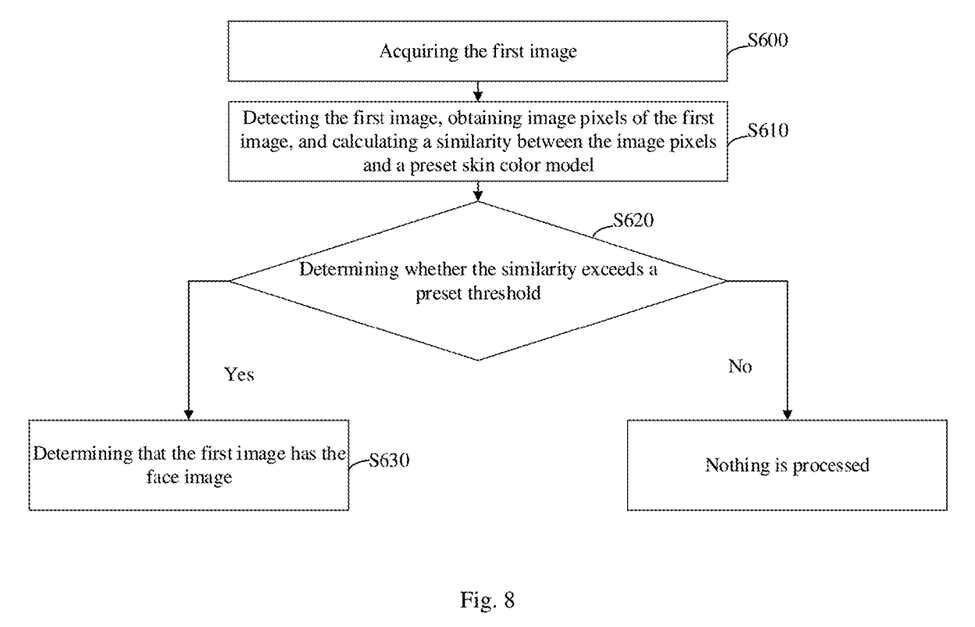
FIG. 8 is a detailed flow chart of operation S100 in an image processing method according to a seventh embodiment of the present disclosure.

Furthermore, based on the first embodiment, a sixth embodiment is proposed. Referring to FIG. 8, FIG. 8 is a detailed flow chart of Operation S100 of image processing shown in FIG. 2. In the present embodiment, Operation S100 includes:

Operation S600, acquiring the first image.

Operation S610, detecting the first image, obtaining image pixels of the first image, and calculating a similarity between the image pixels and a preset skin color model.

In the present embodiment, the similarity can be similarity between the pixel coordinates of the image and the pixel coordinates in a preset skin color model, and the preset skin color model can be trained by a vast number of face image samples with different skin colors based on a CNN model through deep learning.

Operation S620, determining whether the similarity exceeds a preset threshold.

Operation S630, in response that the similarity exceeds the preset threshold, determining that the first image has the face image.

If the similarity does not exceed the preset threshold, nothing is processed.

In the present embodiment, when the similarity exceeds the preset threshold, it indicates that the pixels of the first image have high similarity with the preset skin color model. It is confirmed that there is a face image in the first image.

In the present embodiment, the confirmation of the face image in the first image is performed by detecting similarity between the image pixels of the first image and a preset skin color model, thus realizing accurate confirmation of the face image in the image.

Figure 9:
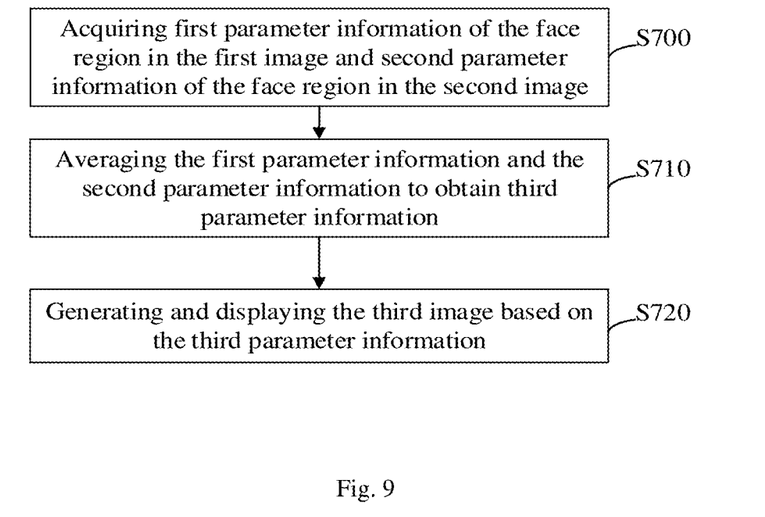
FIG. 9 is a detailed flow chart of operation S140 in an image processing method according to the seventh embodiment of the present disclosure.

Further, a seventh embodiment is proposed based on the first embodiment. Referring to FIG. 9, in the sixth embodiment, the operation S140 includes:

Operation S700, acquiring first parameter information of the face region in the first image and second parameter information of the face region in the second image.

In the present embodiment, the first image is an unprocessed image, and the second image is an image obtained by adjusting the first image. The first parameter image includes brightness information, tone information and saturation information of the pixels in the face region of the first image, and the second parameter image includes brightness information, tone information and saturation information of the face region of the second image.

Operation S710, averaging the first parameter information and the second parameter information to obtain third parameter information.

In the present embodiment, averaging the first parameter information and the second parameter information to obtain third parameter information may be: summing the second parameter information and the first parameter information and then averaging the summed parameter information to obtain third parameter information.

Operation S720, generating and displaying the third image based on the third parameter information.

In the present embodiment, the original first image and the adjusted second image are mixed to obtain an averaged third image, and the face region in the third image is more in line with the viewer's viewing experience.

Furthermore, based on the first embodiment, an eighth embodiment is proposed. In the eighth embodiment, before Operation S100, the method further includes: eliminating a color shift on the first image.

In the present embodiment, due to the influence of the color of the ambient light source, the first image will have color shift, which is adverse to the judgment of a face image in the first image, so it is necessary to perform color shift processing on the first image.

In an embodiment, the color shift processing may specifically be as follows: obtaining the average color value for R channel in the first image as avgR, the average color value for G channel as avgG and the average color value for B channel as avgB, obtaining the average gray value avgGRAY of the first image based on the avgR, AVGG and avgB, and then adjusting the R, G and B values of each pixel to make all the avgR, avgG, and avgB values to trend to the value of avgGRAY.

In addition, the present disclosure further provides a non-transitory computer-readable storage medium, where instructions are stored on the storage medium, and when the instructions are executed by a processor, operations of image processing are implemented as described above.

The specific embodiments regarding the non-transitory computer-readable storage medium in the present disclosure are basically the same as the above-mentioned embodiments of image processing method and will not be described in detail herein.

It should be noted that in this document, the terms "comprising" "including" or any other variation thereof are intended to cover a non-exclusive inclusion, such that a process, method, article, or system that includes a list of elements includes not only those elements, but also other elements not expressly listed, or elements inherent to such process, method, article, or system. Without further restrictions, an element defined by the statement "includes an" does not exclude the presence of another identical element in a process, method, article, or system including the element.

The aforementioned serial numbers regarding the embodiments of the present disclosure are for description only and do not represent the superiority and inferiority of the embodiments.

From the description of the above embodiments, it will be clear to those skilled in the art that the method of the above embodiments can be implemented by means of software plus the necessary general hardware platform, although it can also be implemented by hardware, but in many cases the former is a better embodiment. Based on this understanding, the technical solution of the present disclosure, in essence, or the part contributing to the prior art, can be embodied in the form of a software product stored in a storage medium (such as ROM/RAM, magnetic disk, diskette) as described above, including several instructions to cause a terminal device (which can be a mobile phone, computer, server, air conditioner, or network device, etc.) to perform the methods described in various embodiments of the present disclosure.

The description aforementioned is only the optional embodiment of the present disclosure and is not intended to limit the scope of the present disclosure. Any equivalent structural or flow modification made by using the description and drawings of the present disclosure or direct/indirect application in other related technical fields under the concept of the present disclosure shall be included in the protection scope of the present disclosure.

What is claimed is:

1. An image processing method, comprising:
    acquiring and detecting a first image, and determining whether the first image has a face image;
    in response that the first image has a face image, acquiring image information of a face region where the face image is located in the first image, and calculating an average brightness in the face region based on the image information;
    adjusting a brightness in the face region based on the average brightness and a preset model;
    acquiring parameter information of each pixel in the face region, and adjusting the parameter information of each pixel based on the parameter information and a preset rule to generate a second image, wherein the parameter information of each pixel in the face region comprises tone information of each pixel in the face region and saturation information of each pixel in the face region; and
    averaging the brightness, tone and saturation of pixel in the face region of the second image and of the first image to generate a third image and display the third image.

2. The image processing method of claim 1, wherein the image information comprises color values for each color channel; and the operation of in response that the first image has a face image, acquiring image information of a face region where the face image is located in the first image, and calculating an average brightness in the face region based on the image information comprises:
    in response that the first image has the face image, obtaining a color value for each color channel in the face region; and
    calculating the average brightness in the face region based on the color value for each color channel and a preset algorithm.

3. The image processing method of claim 1, wherein the operation of adjusting a brightness in the face region based on the average brightness and a preset model comprises:
    acquiring the average brightness, and determining whether the average brightness is greater than or equal to a first preset value;
    in response that the average brightness is greater than or equal to the first preset value, increasing brightness of pixels within a middle tone range in the face region and decreasing brightness of pixels within a light tone range in the face region based on the first preset curve model;
    in response that the average brightness is less than the first preset value, determining whether the average brightness is less than a second preset value;
    in response that the average brightness is less than the second preset value, increasing brightness of pixels between the middle tone range and the dark tone range in the face region based on a second preset curve model; and
    in response that the average brightness is less than the first preset value and greater than or equal to the second preset value, increasing the brightness of pixels within the middle tone range in the face region based on a third preset curve model.

4. The image processing method of claim 1, wherein the operation of acquiring parameter information of each pixel in the face region, and adjusting the parameter information of each pixel based on the parameter information and a preset rule, and generating a second image comprises:
- acquiring the tone information of each pixel in the face region, and calculating an average tone value of the face region based on the tone information;
- determining whether the average tone value is greater than or equal to a preset tone value;
- in response that the average tone value is greater than or equal to the preset tone value, reducing a tone value of each pixel in the face region; and
- in response that the average tone value is less than the preset tone value, increasing the tone value of each pixel in the face region, and generating the second image.

5. The image processing method of claim 1, wherein the operation of acquiring parameter information of each pixel in the face region, and adjusting the parameter information of each pixel based on the parameter information and a preset rule, and generating a second image comprises:
- acquiring the saturation information of each pixel in the face region, and calculating an average saturation value of the face region based on the saturation information;
- determining whether the average saturation value is greater than or equal to a preset saturation value;
- in response that the average saturation value is greater than or equal to the preset tone value, increasing a saturation value of each pixel in the face region by a first preset saturation value; and
- in response that the average saturation value is less than the preset saturation, increasing the saturation value of each pixel in the face region by a second preset saturation value, and generating the second image, wherein the second preset saturation value is greater than the first preset saturation value.

6. The image processing method of claim 1, wherein the operation of acquiring and detecting a first image, and determining whether the first image has a face image comprises:
- acquiring the first image;
- detecting the first image, obtaining image pixels of the first image, and calculating a similarity between the image pixels and a preset skin color model;
- determining whether the similarity exceeds a preset threshold; and
- in response that the similarity exceeds the preset threshold, determining that the first image has the face image.

7. The image processing method of claim 1, wherein prior to the operation of acquiring and detecting a first image, and determining whether the first image has a face image, the method further comprises:
- eliminating a color shift on the first image.

8. A terminal, comprising a memory, a processor and a computer program stored on the memory and executable on the processor, wherein the processor executes the program to implement following operations:
- acquiring and detecting a first image, and determining whether the first image has a face image;
- in response that the first image has a face image, acquiring image information of a face region where the face image is located in the first image, and calculating an average brightness in the face region based on the image information;
- adjusting brightness in the face region based on the average brightness and a preset model;
- acquiring parameter information of each pixel in the face region, and adjusting the parameter information of each pixel based on the parameter information and a preset rule to generate a second image, wherein the parameter information of each pixel in the face region comprises tone information of each pixel in the face region and saturation information of each pixel in the face region; and
- averaging the brightness, tone and saturation of pixel in the face region of the second image and of the first image to generate a third image and display the third image.

9. The terminal of claim 8, wherein the image information comprises color values for each color channel; and the operation of in response that the first image has a face image, acquiring image information of a face region where the face image is located in the first image, and calculating an average brightness in the face region based on the image information comprises:
- in response that the first image has the face image, obtaining a color value for each color channel in the face region; and
- calculating the average brightness in the face region based on the color values for each color channel and a preset algorithm.

10. The terminal of claim 8, wherein the operation of adjusting brightness in the face region based on the average brightness and a preset model comprises:
- acquiring the average brightness, and determining whether the average brightness is greater than or equal to a first preset value;
- in response that the average brightness is greater than or equal to the first preset value, increasing brightness of pixels within a middle tone range in the face region and decreasing brightness of pixels within a light tone range in the face region based on the first preset curve model;
- in response that the average brightness is less than the first preset value, determining whether the average brightness is less than a second preset value;
- in response that the average brightness is less than the second preset value, increasing brightness of pixels between the middle tone range and the dark tone range in the face region based on a second preset curve model; and
- in response that the average brightness is less than the first preset value and greater than or equal to the second preset value, increasing the brightness of pixels within the middle tone range in the face region based on a third preset curve model.

11. The terminal of claim 8, wherein the operation of acquiring parameter information of each pixel in the face region, and adjusting the parameter information of each pixel based on the parameter information and a preset rule, and generating a second image comprises:
- acquiring the tone information of each pixel in the face region, and calculating an average tone value of the face region based on the tone information;
- determining whether the average tone value is greater than or equal to a preset tone value;
- in response that the average tone value is greater than or equal to the preset tone value, reducing a tone value of each pixel in the face region; and in response that the average tone value is less than the preset tone value, increasing the tone value of each pixel in the face region, and generating the second image.

12. The terminal of claim 8, wherein the operation of acquiring parameter information of each pixel in the face region, and adjusting the parameter information of each pixel based on the parameter information and a preset rule, and generating a second image comprises:
acquiring the saturation information of each pixel in the face region, and calculating an average saturation value of the face region based on the saturation information;
determining whether the average saturation value is greater than or equal to a preset saturation value;
in response that the average saturation value is greater than or equal to the preset tone value, increasing a saturation value of each pixel in the face region by a first preset saturation value; and
in response that the average saturation value is less than the preset saturation, increasing the saturation value of each pixel in the face region by a second preset saturation value, and generating the second image, wherein the second preset saturation value is greater than the first preset saturation value.

13. The terminal of claim 8, wherein the operation of acquiring and detecting a first image, and determining whether the first image has a face image comprises:
acquiring the first image;
detecting the first image, obtaining image pixels of the first image, and calculating a similarity between the image pixels and a preset skin color model;
determining whether the similarity exceeds a preset threshold; and
in response that the similarity exceeds the preset threshold, determining that the first image has the face image.

14. The terminal of claim 8, wherein prior to the operation of acquiring and detecting a first image, and determining whether the first image has a face image, the method further comprises:
eliminating a color shift on the first image.

15. A non-transitory computer-readable storage medium, wherein computer-readable instructions are stored on the non-transitory computer-readable storage medium, and when the computer-readable instructions are executed by a processor, following operations are implemented:
acquiring and detecting a first image, and determining whether the first image has a face image;
in response that the first image has a face image, acquiring image information of a face region where the face image is located in the first image, and calculating an average brightness in the face region based on the image information;
adjusting brightness in the face region based on the average brightness and a preset model;
acquiring parameter information of each pixel in the face region, and adjusting the parameter information of each pixel based on the parameter information and a preset rule to generate a second image, wherein the parameter information of each pixel in the face region comprises tone information of each pixel in the face region and saturation information of each pixel in the face region; and averaging the brightness, tone and saturation of pixel in the face region of the second image and of the first image to generate a third image and display the third image.

16. The non-transitory computer-readable storage medium of claim 15, wherein the image information comprises a color value of each color channel; if the face image exists in the first image, the operation of obtaining image information of the face region where the face image is located in the first image and calculating the average brightness of the face region based on the image information comprises:
in response that the first image has the face image, obtaining color values for each color channel in the face region; and
calculating the average brightness in the face region based on the color values for each color channel and a preset algorithm.

17. The non-transitory computer-readable storage medium of claim 15, wherein the operation of adjusting the brightness of the face region based on the average brightness and a preset model comprises:
acquiring the average brightness, and determining whether the average brightness is greater than or equal to a first preset value;
in response that the average brightness is greater than or equal to the first preset value, increasing brightness of pixels within a middle tone range in the face region and decreasing brightness of pixels within a light tone range in the face region based on the first preset curve model;
in response that the average brightness is less than the first preset value, determining whether the average brightness is less than a second preset value;
in response that the average brightness is less than the second preset value, increasing brightness of pixels between the middle tone range and the dark tone range in the face region based on a second preset curve model; and
in response that the average brightness is less than the first preset value and greater than or equal to the second preset value, increasing the brightness of pixels within the middle tone range in the face region based on a third preset curve model.

18. The non-transitory computer-readable storage medium of claim 17, wherein the operation of acquiring parameter information of each pixel in the face region, and adjusting the parameter information of each pixel based on the parameter information and a preset rule, and generating a second image comprises:
acquiring the tone information of each pixel in the face region, and calculating an average tone value of the face region based on the tone information;
determining whether the average tone value is greater than or equal to a preset tone value;
in response that the average tone value is greater than or equal to the preset tone value, reducing a tone value of each pixel in the face region; and
in response that the average tone value is less than the preset tone value, increasing the tone value of each pixel in the face region, and generating the second image.

* * * * *